United States Patent
Daito et al.

(10) Patent No.: US 10,620,031 B2
(45) Date of Patent: Apr. 14, 2020

(54) SYSTEM FOR MEASURING LEVEL OF A PRECURSOR IN A CONTAINER

(71) Applicant: Applied Materials, Inc., Santa Clara, CA (US)

(72) Inventors: Kazuya Daito, Milipitas, CA (US); Vijay Venugopal, Berkeley, CA (US)

(73) Assignee: Applied Materials, Inc., Santa Clara, CA (US)

( * ) Notice: Subject to any disclaimer, the term of this patent is extended or adjusted under 35 U.S.C. 154(b) by 93 days.

(21) Appl. No.: 15/627,910

(22) Filed: Jun. 20, 2017

(65) Prior Publication Data
US 2018/0364089 A1     Dec. 20, 2018

(51) Int. Cl.
| *G01F 23/26* | (2006.01) |
| *G01F 23/28* | (2006.01) |
| *G01F 23/00* | (2006.01) |
| *G01F 17/00* | (2006.01) |

(52) U.S. Cl.
CPC .......... *G01F 23/26* (2013.01); *G01F 23/0007* (2013.01); *G01F 23/263* (2013.01); *G01F 23/28* (2013.01); *G01F 17/00* (2013.01); *G01F 23/268* (2013.01)

(58) Field of Classification Search
None
See application file for complete search history.

(56) References Cited

U.S. PATENT DOCUMENTS

| 7,938,180 | B2 * | 5/2011 | Levy | ..................... E21B 47/042 166/250.03 |
| 2005/0006027 | A1 | 1/2005 | Li et al. | |
| 2005/0095859 | A1 | 5/2005 | Chen et al. | |
| 2005/0280424 | A1 | 12/2005 | Qu et al. | |
| 2008/0099933 | A1 | 5/2008 | Choi et al. | |
| 2012/0268139 | A1 * | 10/2012 | Fend | ........................ G01F 23/24 324/601 |

FOREIGN PATENT DOCUMENTS

KR     10-2013-0045585 A     5/2016

OTHER PUBLICATIONS

International Search Report and Written Opinion dated Oct. 15, 2018 in corresponding PCT application No. PCT/US2018/037265.

* cited by examiner

*Primary Examiner* — Douglas X Rodriguez
(74) *Attorney, Agent, or Firm* — Nields, Lemack & Frame, LLC (57) ABSTRACT

An apparatus for the detecting the amount of material remaining in a container is disclosed. This apparatus may be beneficial when used with a semiconductor processing device, especially when the material is in the solid phase. The apparatus measures the impedance between an electrode disposed in the container, and the outside of the container to make a determination regarding how full the container may be. In certain embodiments, only the magnitude of the impedance is used for this calculation. In other embodiments, the magnitude and phase of the impedance are used. This may be used to determine the topology of the material within the container.

19 Claims, 6 Drawing Sheets

SYSTEM FOR MEASURING LEVEL OF A PRECURSOR IN A CONTAINER

FIELD

Embodiments relate to an apparatus for determining an amount of precursor remaining in a container, and more particularly, to the amount of solid precursor remaining in an ampoule.

BACKGROUND

Semiconductors are fabricated by subjecting a workpiece to a plurality of processes. Some of these processes including deposition, etching and ion implantation. To perform an ion implant, a dopant material may be used. This dopant material may be in the form of a gas, liquid or solid. To perform an etching process, an etching material may be used. Similarly, a suitable material may be used for deposition processes. Thus, in all of these processes, there may be a material of interest, which may be a gas, liquid or solid. The material of interest is often stored in a container, such as an ampoule.

While the process is being performed, it may be advantageous to monitor the amount of the material of interest. For example, if the material of interest is exhausted, the workpieces being processed will be flawed. Further, unexpected downtime is experienced to remove and replace the container holding the material of interest.

The amount of remaining material may be monitored for certain materials. For example, if the material of interest is a gas, the flow rate of the gas can be used to determine the amount of material remaining. A similar approach may be used if the material of interest is a liquid.

Unfortunately, measuring the amount of remaining material is more complex if the material of interest is a solid. Typically, the material of interest is extracted by allowing a carrier gas to flow into the container. The carrier gas draws the gaseous phase material of interest which is evaporated inside the container. Since carrier gas is flowing into the container, and a gaseous phase material is flowing from the container, an accurate measure of the flow rate of the material of interest is very difficult.

Therefore, an apparatus that allows the amount of material remaining within a container to be determined would be beneficial. It would be advantageous if the apparatus was able to monitor the amount of the material continuously.

SUMMARY

An apparatus for the detecting the amount of material remaining in a container is disclosed. This apparatus may be beneficial when used with a semiconductor processing device, especially when the material is in the solid phase. The apparatus measures the impedance between an electrode disposed in the container, and the outside of the container to make a determination regarding how full the container may be. In certain embodiments, only the magnitude of the impedance is used for this calculation. In other embodiments, the magnitude and phase of the impedance are used. This may be used to determine the topology of the material within the container.

According to one embodiment, an apparatus for measuring the amount of material in a container is disclosed. The apparatus comprises a container, having an opening, wherein the container is electrically conductive; an electrode entering the container through the opening and extending into an interior of the container; and a device capable of measuring impedance, wherein the impedance is measured between the electrode and an outer surface of the container. In certain embodiments, the apparatus further comprises a controller in communication with the device to convert the impedance into a fill level. In certain embodiments, the container is cylindrical and the opening is disposed on a top surface and is not concentric with a center of the container. In certain further embodiments, the electrode has an upper portion that passes through the opening and a lower portion that is aligned with the center of the container. In certain further embodiments, the electrode has a U-shape with a downward portion that passes through the opening and an upward portion.

According to another embodiment, a semiconductor processing system is disclosed. The semiconductor processing system comprises a semiconductor processing device; a container, having a material disposed therein, wherein the container comprises an outlet in communication with the semiconductor processing device and an opening; an electrode extending through the opening into an interior of the container; a device for measuring impedance; and a controller in communication with the device to determine an amount of material remaining in the container, wherein the impedance measured by the device is representative of the amount of material remaining in the container. In certain embodiments, the controller instructs the semiconductor processing device to terminate operation if the amount of material is less than a predetermined threshold.

According to another embodiment, a method of determining an amount of material remaining within a container is disclosed. The method comprises measuring an impedance between an electrode disposed within the container and an outer surface of the container; and determining, based on the measured impedance, an amount of material remaining in the container. In certain embodiments, the determining is performed based on a relationship between the amount of material in the container and the measured impedance. In some embodiments, the relationship is determined by placing a known amount of material in the container; measuring an impedance between the electrode and the outer surface of the container; repeating the placing and measuring with different amount of material to acquire a plurality of data points; and using the plurality of data points to determine the relationship. In some embodiment, the method further comprises providing an indication of material level or taking a corrective action when the amount of material is less than a predetermined threshold.

BRIEF DESCRIPTION OF THE FIGURES

For a better understanding of the present disclosure, reference is made to the accompanying drawings, which are incorporated herein by reference and in which.

DETAILED DESCRIPTION

Figure 1:
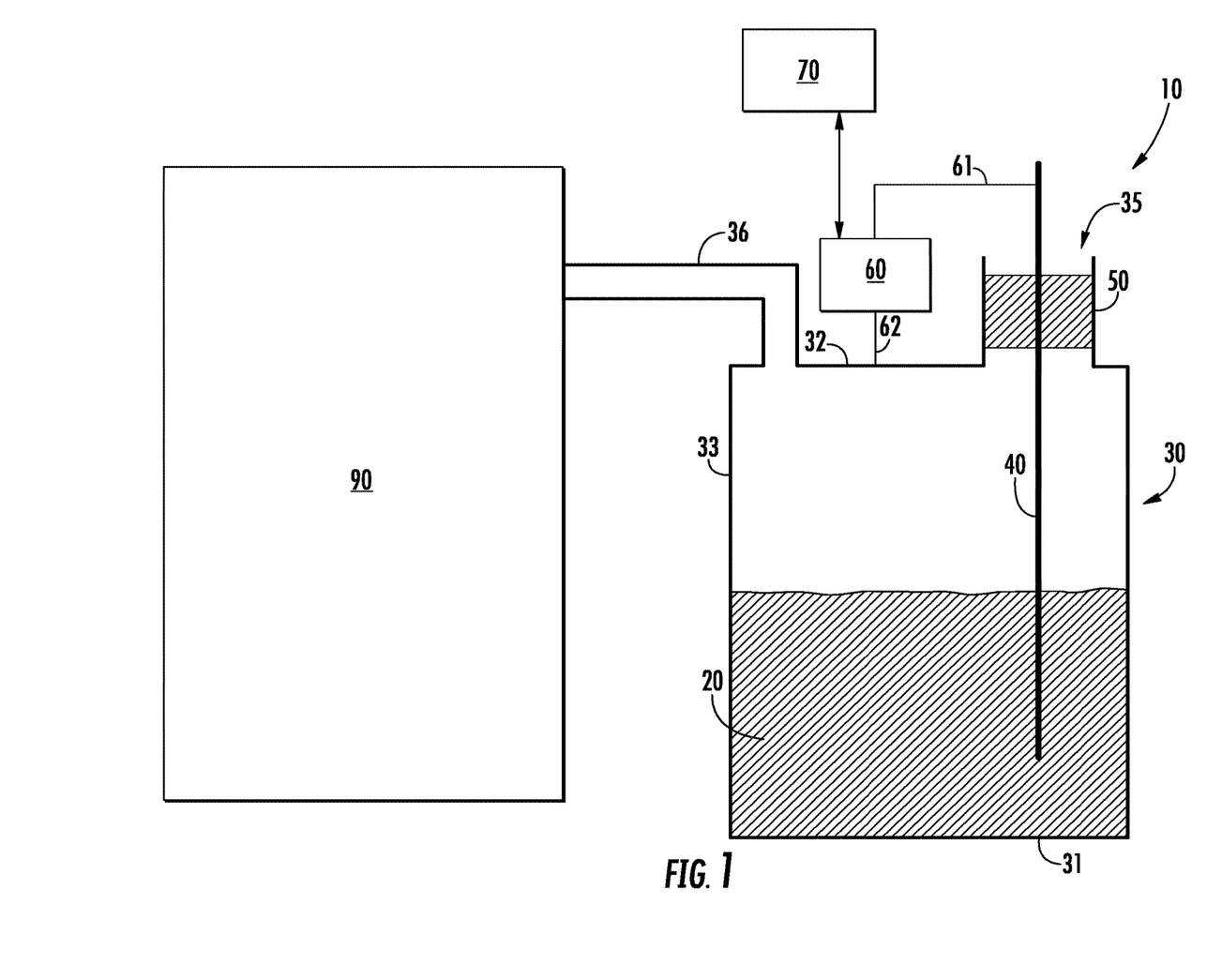
FIG. 1 shows an apparatus for determining an amount of material remaining in a container according to one embodiment.

FIG. 1 shows an apparatus 10 for determining an amount of material 20 remaining within a container 30 according to a first embodiment. The container 30 may be made of a conductive material, such as a metal. In certain embodiments, the container 30 may be stainless steel. In certain embodiments, the container 30 may be referred to as an ampoule. In certain embodiments, the container 30 may be cylindrical in shape, with a bottom surface 31, a top surface 32 and a cylindrical sidewall 33. The container 30 may has a diameter of about 6 inches and a height of 8 inches, although other dimensions may be used as well. An output port 36 is in communication with a semiconductor processing device 90, and transports the gaseous material of interest from the container 30 to the semiconductor processing device 90. An opening 35 is used to determine an amount of material in the container 30, as described in more detail below. Although only two openings are shown on the top surface 32 of the container 30, it is understood that there may be a plurality of openings. For example, as described above, a third opening may be used to allow a carrier gas to enter the container 30. Further, FIG. 1 shows opening 35 as being located offset from the center of the container 30. However, in other embodiments, the opening 35 may be at the center of the top surface 32. In certain embodiments, the opening 35 may be disposed on the cylindrical sidewall 33.

A material 20 is disposed within the container 30. As described above, this material 20 may be used in a semiconductor process, such as a deposition, etching or implantation process. This material may be in solid form, although it may be in liquid form in other embodiments. This material 20 may evaporate and be used in the semiconductor processing device 90. As such, the material 20 may be considered a precursor. The material has a dielectric constant ($\kappa$), which may be greater than 3 in certain embodiments. The actual composition of the material 20 is not limited by this disclosure.

As described above, the semiconductor processing device 90 may be a deposition machine, such as a machine capable of atomic layer deposition (ALD), chemical vapor deposition (CVD) or plasma enhanced CVD (PECVD). Alternatively, the semiconductor processing device 90 may be an ion implanter, such as a beam line ion implanter or a plasma chamber. Additionally, the semiconductor processing device may be an etching machine.

An electrode 40 is inserted into the container 30 through the opening 35. The electrode 40 is made of a conductive material, such as a metal. In certain embodiments, the electrode 40 may be brass, although other materials may also be used. The electrode 40 is extended into the container such that it terminates about 5 mm above the bottom surface 31. Of course, the electrode 40 may be extended to a different depth. In one particular embodiment, the electrode 40 has a diameter of 4.5 mm, although other sizes are also within the scope of the disclosure. The electrode 40 is held in place within the opening 35 through the use of an insulator 50. The insulator 50 may be cylindrical in shape and have an outer radius, which is roughly equal to the inner radius of the opening 35. The insulator 50 may also have an inner opening through which the electrode 40 passes. The insulator 50 is used to mechanically support the electrode 40 and also to electrically isolate the electrode 40 from the container 30. The electrode 40 extends above the top surface of the insulator 50 so that it is accessible outside the container 30. The insulator 50 may be made of a ceramic or polymer in certain embodiments.

A device capable of measuring impedance, such as network analyzer 60, is disposed between the electrode 40 and the container 30. Specifically, the network analyzer 60 has two leads; a first lead 61, which is in electrical communication with the electrode 40 and a second lead 62, which is in electrical communication with the container 30. In certain embodiments, the second lead 62 is in communication with the top surface 32 of the container 30. In other embodiments, the second lead 62 is in communication with a different portion of the outer surface of the container 30. The network analyzer 60 is capable of measuring impedance, preferably at one or more frequencies.

Figure 2:
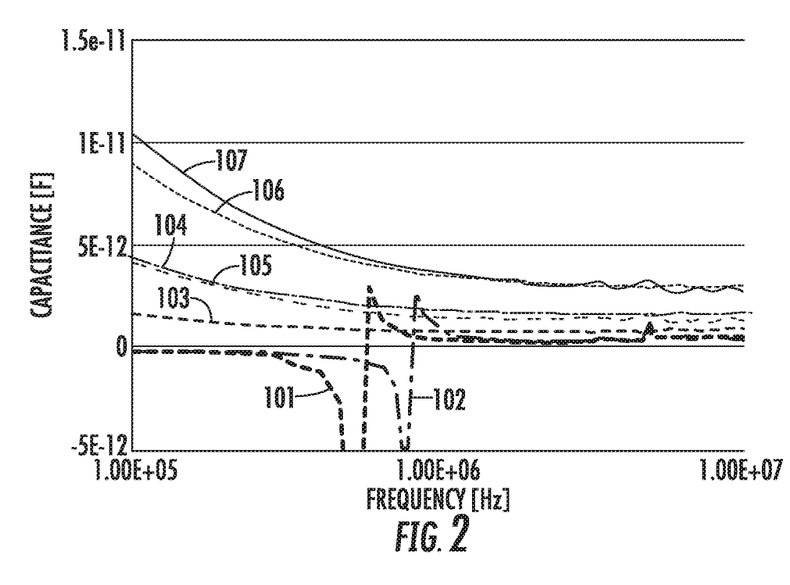
FIG. 2 shows a graph illustrating a relationship between capacitance, frequency and amount of material remaining in the container.

FIG. 2 shows a plurality of graphs that show the relationship between impedance, as measured by the network analyzer 60 and frequency. In this graph, the impedance is expressed as capacitance and is measured at frequencies between 100 kHz and 10 MHz. In this test, it is assumed that 8 cm of material is considered to be completely full. Lines 101 and 102 each represent the relationship when there is no material 20 remaining in the container 30. Note that the network analyzer 60 measures nearly no capacitance across the entire frequency spectrum. The disturbance near the middle of the horizontal axis represents a resonant condition. Line 103 represent the relationship when there is about 1.5 cm of material 20 remaining in the container 30. Lines 104 and 105 each represent the relationship when there is about 4 cm of material 20 remaining in the container 30. Lines 106 and 107 each represent the relationship when there is about 8 cm of material 20 remaining in the container 30. Thus, lines 106, 107 represent a full container, lines 101, 102 represent an empty container, and lines 104, 105 represent a half full container. Note that, with exception of the resonant condition, at every frequency, the magnitude of the impedance is indicative of the amount of material 20 remaining in the container 30. Specifically, the greater the measured impedance, the greater the amount of material 20 remaining in the container 30.

Figure 3:
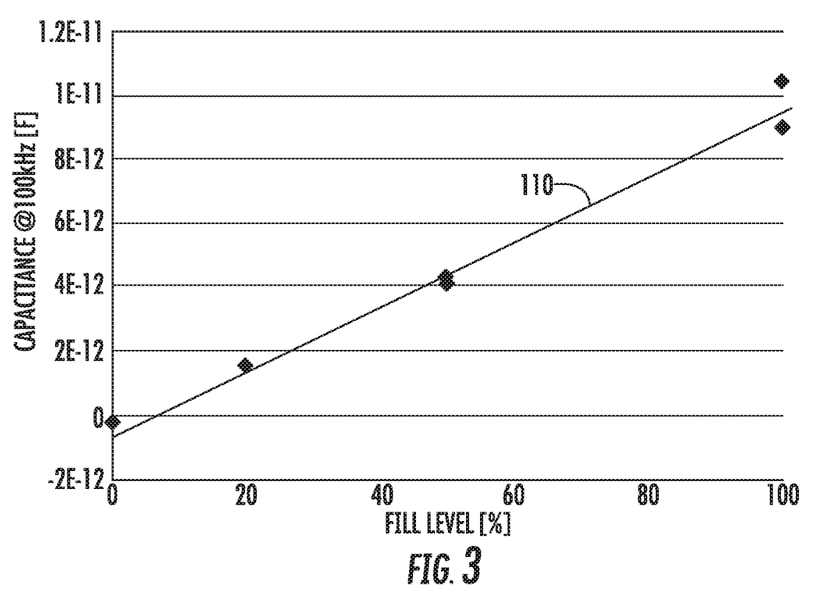
FIG. 3 shows a graph showing the relationship between capacitance and the amount of material remaining in the container at one frequency.

FIG. 3 shows a graph of impedance, expressed as capacitance, vs. amount of material remaining in the container 30 at one particular frequency, which may be 100 kHz. The impedance that were measured at this particular frequency in FIG. 2 have been used in FIG. 3. Further, a line 110, which represents the line of best fit, has been added. Note that there is a linear relationship between fill level and impedance. Based on this graph, an equation which defines fill level as a function of impedance may be determined. Thus, by measuring the impedance using the apparatus of FIG. 1, an estimate of the amount of material 20 remaining within the container 30 may be made. Note that this graph was created using a particular material and at a particular frequency. The slope of the line 110 in this graph may be a function of the measurement frequency and also of the dielectric constant of the material 20. Further, while FIG. 3 shows the relationship as measured at 100 kHz, the disclosure is not limited to this particular frequency. As readily seen in FIG. 2, other frequencies may also be used to generate the graph shown in FIG. 3. Further, the disclosure is not limited to the frequency spectrum shown in FIG. 2. For example, impedance may be measured at lower frequencies or higher frequencies than are displayed in FIG. 2.

Further, although FIG. 3 shows a linear relationship between impedance and fill level, the disclosure is not limited to this embodiment. For example, after plotting a number of points, a line of best fit, which is not linear may be drawn. Thus, the relationship is not limited to being linear, and may be a polynomial of any degree, may be exponential, logarithmic, or some other function.

Having determined that a relationship exists between the impedance measured by the network analyzer 60 and the amount of material 20 remaining in the container 30, this information can be indicated to an operator in several ways.

In certain embodiments, as shown in FIG. 1, the network analyzer 60 may be in communication with a controller 70. The controller 70 has a processing unit and an associated memory device. This memory device contains the instructions, which, when executed by the processing unit, enable the controller 70 to perform its intended functions. This memory device may be a non-volatile memory, such as a FLASH ROM, an electrically erasable ROM or other suitable devices. In other embodiments, the memory device may be a volatile memory, such as a RAM or DRAM. In certain embodiments, the memory device may be packaged with the processing unit. The processing unit may be any suitable device, including but not limited to a general purpose processor, an application specific processor, an embedded controller, or a personal computer (PC).

In embodiments that utilize a controller 70, the controller 70 may interface with the network analyzer 60. The controller 70 may provide an indication of the amount of material 20 remaining in the container 30. For example, the controller 70 may interface with or include a visual display, which displays an indication of the amount of material 20 remaining in the container 30. This may be in the form as a gauge, or another other suitable format. In another embodiment, the controller 70 may include an audio alert, indicating that the amount of material is less than a predefined threshold. In yet another embodiment, the controller 70 is in communication with the semiconductor processing device 90, such that when the fill level drops below a predefined threshold, the controller 70 instructs the semiconductor processing device 90 to stop processing additional workpieces. Thus, the controller 70 may be used to provide an indication to an operator and/or may be used to terminate the operation of the semiconductor processing device 90. For example, the controller 70 may provide an indication to the operator at a first predefined threshold, thus allowing the operator to take a corrective action. If the material level reaches a second predefined threshold, lower than the first predefined threshold, the controller 70 instructs the semiconductor processing device 90 to terminate operation.

Figure 4:
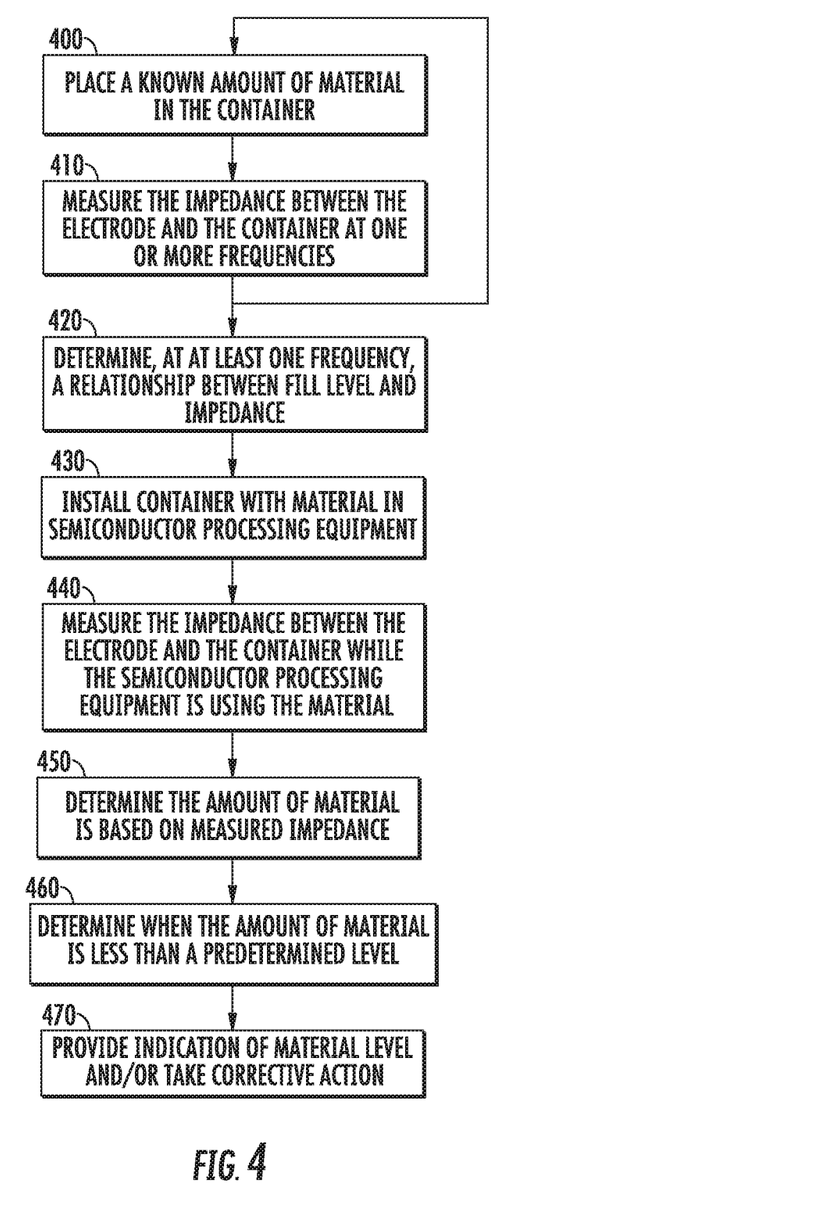
FIG. 4 shows a flowchart according to one embodiment.

FIG. 4 shows a flowchart explaining a method of determining a level of material 20 in a container 30 according to one embodiment. First, in Box 400, a known amount of material 20 is disposed in the container 30. Then, in Box 410, the impedance between the electrode 40 and the container 30 is measured at one or more frequencies. The processes shown in Boxes 400, 410 may then be repeated a plurality of time for different amounts of material 20. These processes may result in a set of curves, such as those shown in FIG. 2. When a sufficient number of data points have been gathered, a relationship between the measured impedance and the amount of material is determined, as shown in Box 420. This may result in a graph such as FIG. 3. Thus, the processes shown in Boxes 400, 410 and 420 may be considered a calibration process, which establishes the relationship between impedance and fill level that will be exploited. This relationship may be unique to this particular material. Therefore, if a different material is used as the precursor, the calibration process may be repeated.

Once this relationship has been established, the apparatus may be used in a production environment. This may be performed by installing the container with material disposed therein in the semiconductor processing device, as shown in Box 430. During normal operation, the impedance between the electrode 40 and the container 30 may be measured, as shown in Box 440. This measurement may be performed continuously, randomly or at fixed time intervals. The amount of material remaining in the container is then determined based on the measured impedance, as shown in Box 450. This may be performed by using the relationship found in Box 420. At some point in time, the level of material 20 within the container 30 drops below a predetermined threshold, as shown in Box 460. At this point, some action may be taken, as shown in Box 470. This action may involve providing an indication of the material level, providing an alert, or taking some type of corrective action.

Figure 5:
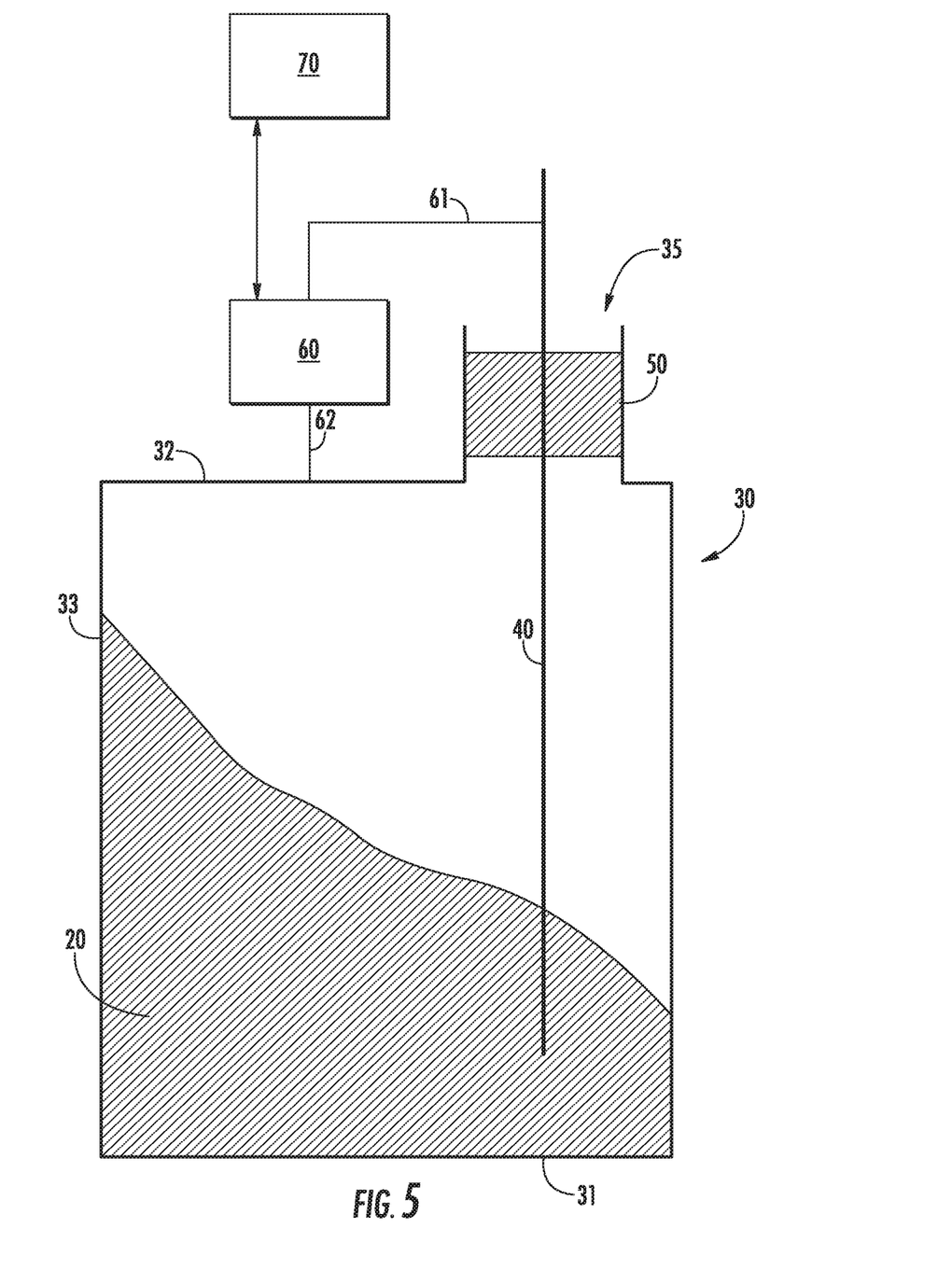
FIG. 5 shows the apparatus of FIG. 1, where the material within the container is not level.

In certain embodiments, the topology of the material 20 within the container 30 may affect the impedance measurements. For example, FIG. 5 shows the apparatus of FIG. 1. However, in this embodiment, the material 20 is not level. Rather, it is loaded such that the material 20 extends up onto the left side of the cylindrical sidewall 33 much more than on the right side. Thus, in the scenario shown in FIG. 5, it is possible that the network analyzer 60 measures an impedance that is less than expected, due the topology of the material 20. This may be due to the fact that the electrode 40 is closer to the cylindrical sidewall 33 on the right side than the cylindrical sidewall 33 on the left side. Therefore, the amount of material that exists between the electrode 40 and the nearest cylindrical sidewall 33 may dominate the impedance measurement.

This inaccuracy due to topology may be addressed in a number of ways. First, it is noted that opening 35 is offset from the center of the container 30. Placing the opening 35 so that it is concentric with the container 30 may reduce or eliminate this inaccuracy.

Figure 6A:
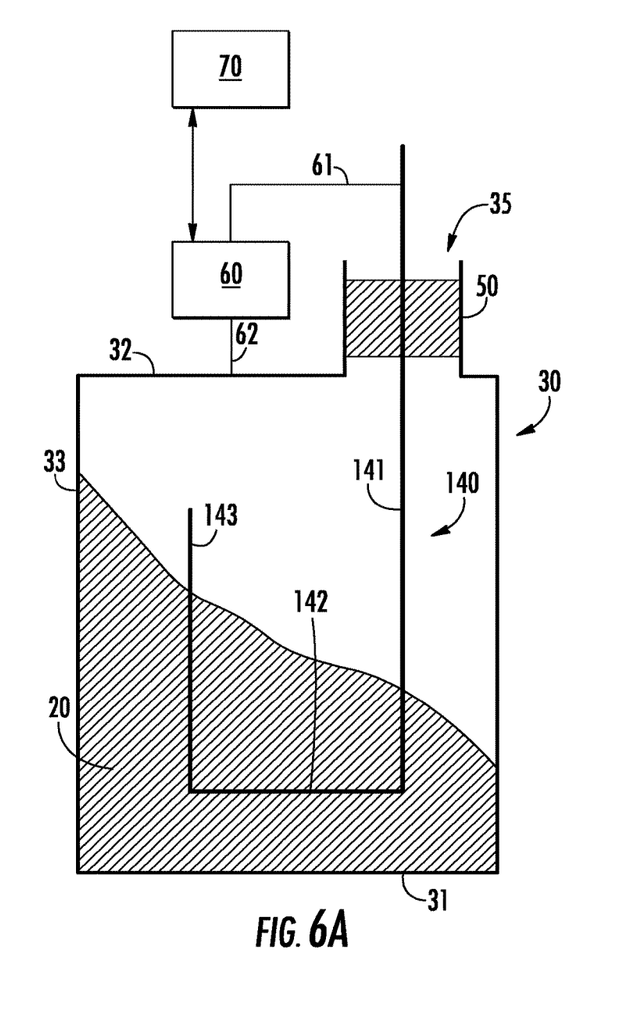
FIGS. 6A-6B each show an apparatus for determining an amount of material remaining in a container according to another embodiment.

However, in certain embodiments, the locations of the opening 35 in the container 30 is fixed and cannot be changed. Thus, in certain embodiments, the shape of the electrode is changed to compensate for the difference between the center of the opening 35 and the center of the container 30. FIG. 6A shows one such embodiment. In this embodiment, the electrode 140 has been formed in a U-shape. The U-shape includes a downward portion 141, an upward portion 143 and a connecting portion 142. The connecting portion 142 may meet the upward portion 143 and the downward portion 141 at right angles. However, the disclosure is not limited to this embodiment. The connecting portion 142 may be formed such that the upward portion 143 of the U-shape is as close to the cylindrical sidewall 33 on the left side as the downward portion 141 of the U-shape is to the cylindrical sidewall 33 on the right side. In other words, the downward portion 141 is disposed a first distance from the nearest cylindrical sidewall 33. The connecting portion is configured so that the upward portion 143 is disposed the same distance from the sidewall that is on the opposite side of the container 30. This may allow the measured impedance to be representative of the average level of the material 20. In another embodiment, the upward portion 143 of the U-shape may be formed so that it is disposed exactly in the center of the container 30.

Figure 6B:
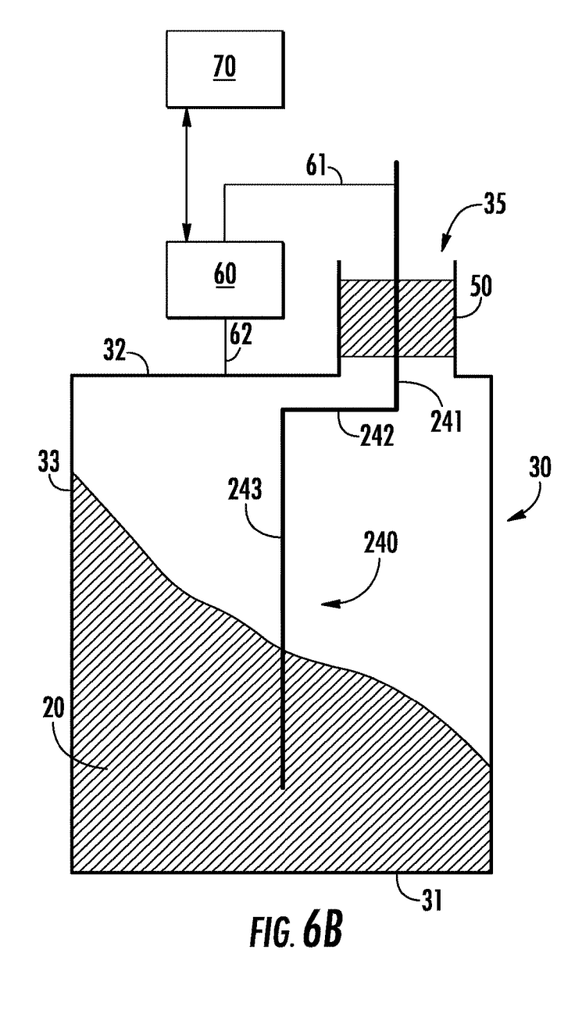

FIG. 6B shows another shape that may be used. In this embodiment, the electrode 240 is formed so that the lower portion 243 of the electrode 240 is aligned with the center of the container 30. Thus, the electrode 240 comprises an upper portion 241 that exits through the opening 35. The electrode 240 comprises a lower portion 243 that is aligned with the center of the container 30. The electrode 240 also has a connecting portion 242 that serves to connect the upper portion 241 with the lower portion 243. While FIG. 6B shows the connecting portion 242 meeting the upper portion 241 and the lower portion 243 at right angles, the disclosure is not limited to this embodiment. For example, the connecting portion 242 may be curved.

FIGS. 6A-6B demonstrate two embodiments that may be used to compensate for material topology, especially in instances where the opening 35 is not aligned with the center of the container 30. These embodiments utilize changes to the structure or shape of the electrode. Further, other embodiments are also possible.

While FIGS. 2 and 3 show the impedance as measured by the network analyzer 60, more information may be obtained from the network analyzer 60. For example, rather than simply capturing and recording the impedance, the magnitude and phase of the impedance may be measured and recorded.

Figure 7:
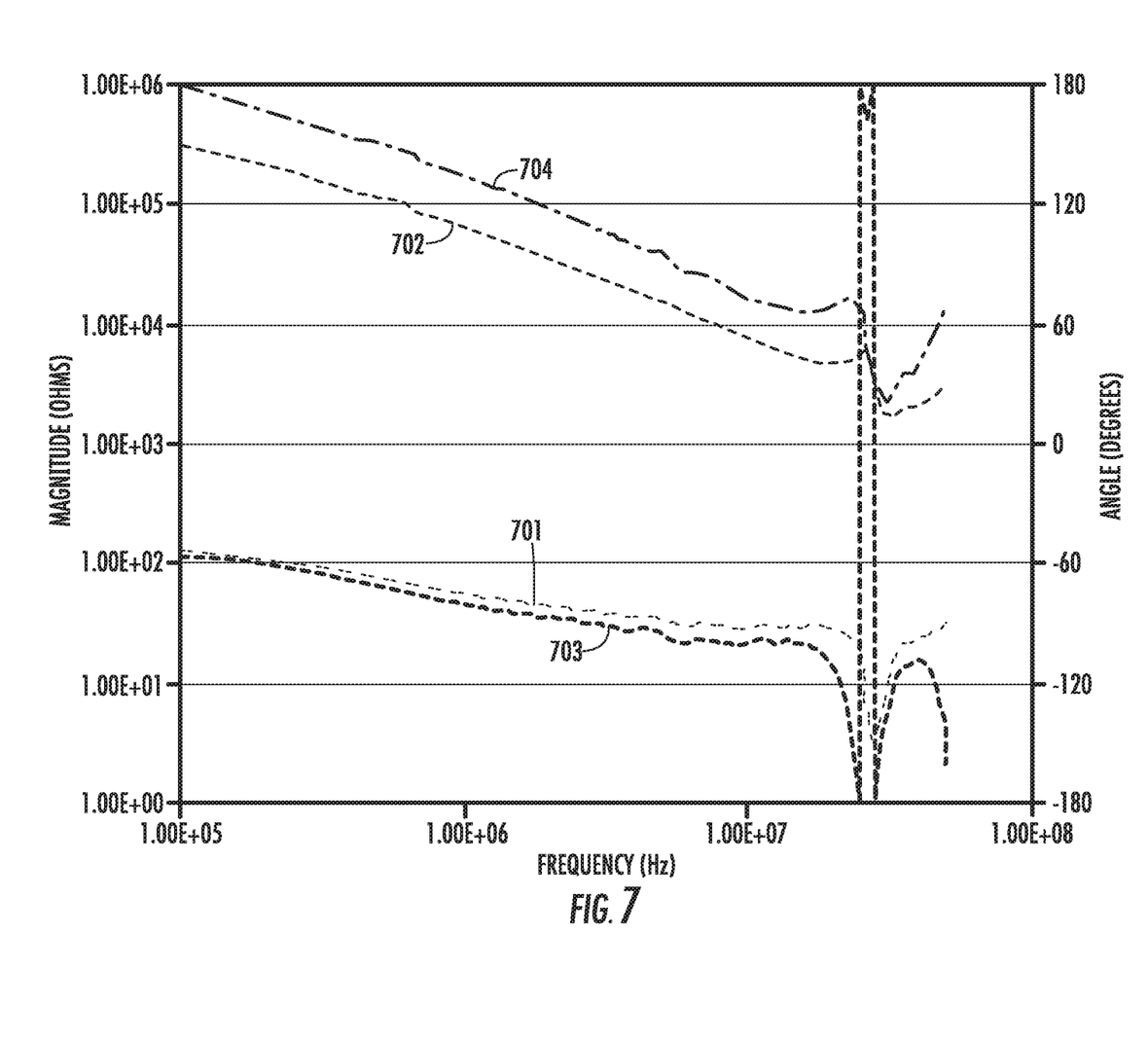
FIG. 7 shows a graph illustrating phase and magnitude as a function of the tilt of the material.

FIG. 7 shows the magnitude and phase of the impedance as measured by the network analyzer 60 for two different configurations. In one configuration, the material of interest was tilted toward the right side of the container 30. In the other configuration, the material of interest was tilted toward the left side of the container 30. Lines 701, 702 show the phase and magnitude, respectively, when the material 20 is tilted toward the right side of the container 30. Lines 703, 704 show the phase and magnitude, respectively, when the material 20 is tilted toward the left side of the container 30. Thus, not only does the magnitude of the impedance change as a function of fill level, but the phase of the impedance also varies as a function of fill level and the topology of the material 20. Specifically, while the two configurations use the same amount of material, the phase and magnitude of the impedance changes for these two configurations. The magnitude is greater when the material 20 is tilted to the left (see line 704). However, the phase is greater when the material 20 is tilted to the right (see line 701). Thus, the use of phase and magnitude may allow the operator to determine a topology of the material 20 and the actual fill level.

The present apparatus has many advantages. It is difficult to estimate an amount of material remaining in a container in a semiconductor processing device. Consequently, in some embodiments, the container is refilled too early to ensure that the material is not completely exhausted. In other embodiments, the material may be completely exhausted before the container is refilled, resulting in improperly processed workpieces, which are discarded. Furthermore, the present apparatus utilizes low frequency impedance measurements, which may not utilize expensive instrumentation. Therefore, the apparatus may be attached to each semiconductor processing device with limited financial impact.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An apparatus for measuring an amount of material in a container, comprising:
    a container, having an opening, wherein the container is electrically conductive;
    an electrode entering the container through the opening and extending into an interior of the container; and
    a device for measuring impedance, wherein an impedance is measured between the electrode and an outer surface of the container, wherein the electrode has a U-shape with a downward portion that passes through the opening and an upward portion.

2. The apparatus of claim 1, wherein the device measures capacitance.

3. The apparatus of claim 1, further comprising a controller in communication with the device to convert the impedance into a fill level.

4. The apparatus of claim 3, wherein the controller provides an indication of the fill level.

5. The apparatus of claim 1, wherein the impedance is measured at a frequency between 100 kHz and 10 MHz.

6. The apparatus of claim 1, wherein the container is cylindrical and the opening is disposed on a top surface and is not concentric with a center of the container.

7. The apparatus of claim 1, wherein the downward portion is disposed a first distance from a nearest sidewall and the upward portion is disposed the first distance for a sidewall on an opposite side of the container.

8. A semiconductor processing system comprising:
    a semiconductor processing device;
    a container, having a material disposed therein, wherein the container comprises an outlet in communication with the semiconductor processing device and an opening;
    an electrode extending through the opening into an interior of the container;
    a device for measuring impedance; and
    a controller in communication with the device to determine an amount of material remaining in the container, wherein the impedance is measured by the device at a predetermined frequency, and wherein the controller uses a known relationship between the impedance at the predetermined frequency and a fill level to determine a value that is representative of the amount of material remaining in the container, wherein the known relationship is determined by:
    placing a known amount of material in the container;
    measuring an impedance between the electrode and the outer surface of the container at the predetermined frequency;
    repeating the placing and measuring with different amount of material to acquire a plurality of data points, wherein the plurality of points are all acquired at the predetermined frequency; and
    using the plurality of data points to determine the known relationship.

9. The semiconductor processing system of claim 8, wherein the controller provides an indication of the amount of material remaining in the container.

10. The semiconductor processing system of claim 8, wherein the controller instructs the semiconductor processing device to terminate operation if the amount of material is less than a predetermined threshold.

11. The semiconductor processing system of claim 8, wherein the impedance is a function of amount of material remaining in the container, a dielectric constant of the material, and the predetermined frequency.

12. The semiconductor processing system of claim 8, wherein the predetermined frequency is between 100 kHz and 10 MHz.

13. The semiconductor processing system of claim 8, wherein the container is cylindrical and the opening is disposed on a top surface and is not concentric with a center of the container.

14. The semiconductor processing system of claim 13, wherein the electrode has an upper portion that passes through the opening and a lower portion that is aligned with the center of the container.

15. The semiconductor processing system of claim 8, wherein the device measures capacitance.

16. A method of determining an amount of material remaining within a container, comprising:
   measuring an impedance between an electrode disposed within the container and an outer surface of the container at a predetermined frequency; and
   determining, based on the measured impedance at the predetermined frequency and a relationship between the amount of material in the container and the measured impedance at the predetermined frequency, an amount of material remaining in the container;
wherein the relationship is determined by:
placing a known amount of material in the container;
measuring an impedance between the electrode and the outer surface of the container at the predetermined frequency;
repeating the placing and measuring with different amount of material to acquire a plurality of data points, wherein the plurality of points are all acquired at the predetermined frequency; and
using the plurality of data points to determine the relationship.

17. The method of claim 16, wherein the relationship is linear.

18. The method of claim 16, further comprising:
providing an indication of material level.

19. The method of claim 16, further comprising:
taking a corrective action when the amount of material is less than a predetermined threshold.

* * * * *